United States Patent [19]

Stafford

[11] Patent Number: 4,640,732

[45] Date of Patent: Feb. 3, 1987

[54] APPARATUS FOR FUSION JOINING OF THERMOPLASTIC PIPES

[75] Inventor: Trevor G. Stafford, Whitley Bay, England

[73] Assignee: British Gas Corporation, London, England

[21] Appl. No.: 837,755

[22] Filed: Mar. 10, 1986

[30] Foreign Application Priority Data

Mar. 25, 1985 [GB] United Kingdom ............... 8507711

[51] Int. Cl.[4] .............................................. B65H 69/06
[52] U.S. Cl. .................................... 156/358; 156/158; 156/304.2; 156/499; 156/503; 264/248
[58] Field of Search .......................... 100/50; 138/155; 156/64, 158, 304.2, 499, 358, 503; 264/248; 269/43; 425/146

[56] References Cited

U.S. PATENT DOCUMENTS

| | | | |
|---|---|---|---|
| 3,729,360 | 4/1973 | McElroy | 156/499 |
| 4,008,118 | 2/1977 | Wesebaum et al. | 156/499 |
| 4,263,084 | 4/1981 | Takala | 156/503 |
| 4,352,708 | 10/1982 | McElroy | 156/304.2 X |
| 4,390,384 | 6/1983 | Turner | 156/304.2 X |

FOREIGN PATENT DOCUMENTS

| | | | |
|---|---|---|---|
| 59-38023 | 3/1984 | Japan | 156/358 |
| 8203199 | 9/1982 | PCT Int'l Appl . | |
| 2124316 | 2/1984 | United Kingdom | 156/358 |

*Primary Examiner*—Robert A. Dawson
*Attorney, Agent, or Firm*—Larson and Taylor

[57] ABSTRACT

The apparatus increases the hydraulic pressure in rams 16 until one pipe moves towards a heater plate 14. The movement is detected by a limit switch 26 and a microprocessor-based control system 28 adds a pre-programmed value of pressure to that pressure which caused the movement (drag pressure). The total pressure is applied to force the pipe ends against a heater plate 14 to form end beads (bead-up). After heating for a pre-programmed period the control system automatically initiates plate retraction and forces the pipe ends together (fusion) for another programmed period. The applied pressure is the sum of the recorded drag pressure and a pre-programmed added pressure. Operator judgement of bead size, pressures and time periods is eliminated. Pressurised fluid is supplied to the rams 16 from a pump and accumulator combination. The sense of ram motion is determined by changeover valves controlled by the control system 28.

6 Claims, 8 Drawing Figures

APPARATUS FOR FUSION JOINING OF THERMOPLASTIC PIPES

The invention relates to apparatus for joining, by fusion, pipes made of thermoplastic material particularly, though not exclusively, natural gas distribution pipes.

Natural gas distribution pipes of thermoplastic material are conventionally joined by means of apparatus having two clamps engageable with the pipes and a hydraulic ram to force the clamps towards one another. The rams are pressurised by a manually operable pump. The pipe ends are firstly heated by being forced against a heater plate, then the pipes are separated by retraction of the ram, the plate is retracted, and the pipe ends are forced together to make the joint. The disadvantage of such known procedures is that it is difficult for the operator to judge the size of the beads formed at the ends of the pipes while the pipes are forced against the plate ("bead-up") and to judge the further forming of the beads as the pipe ends are forced together ("fusion"). The operator is also required to control the time during which the pipe ends are heated and forced together. The strengths of such joints are therefore likely to be impaired in some cases. Also, the internal bead is likely to extend radially into the pipe beyond an acceptable limit so that the flow of gas is impeded.

It has been proposed in PCT patent application No. DE82/00047 Publication No. WO82/03199 to supply pressure to a ram in a butt fusion machine from a pump and an accumulator.

The object of the invention is to provide apparatus by means of which pipes of thermoplastic material can be joined without reliance upon manual control of the ram pressure during bead-up and fusion.

Apparatus for joining thermoplastic pipes by fusion according to the invention comprises two clamps mounted on a guide structure, hydraulic ram means operable to force one clamp towards the other along the guide structure, a switch arranged to detect movement of one clamp towards the other clamp, a microprocessor-based control system, a source of pressurised hydraulic fluid including a pump, a hydraulic control valve which has a control solenoid and which is operable in response to control of solenoid current by said system to increase the ram means fluid pressure at a pre-programmed relatively lower first rate until said switch detects said movement, whereupon said system changes said solenoid current by a pre-programmed amount so that said pressure is further increased at a relatively higher second rate and the ram means completes its advance to effect bead-up.

Preferably, a value corresponding to the fluid pressure causing said movement is stored by said system.

Preferably, a pressure is applied during fusion which is the sum of the pressure corresponding to said value and a further pre-programmed pressure.

An embodiment of apparatus according the invention will now be described by way of example with reference to the accompanying drawings in which.

Figure 1:
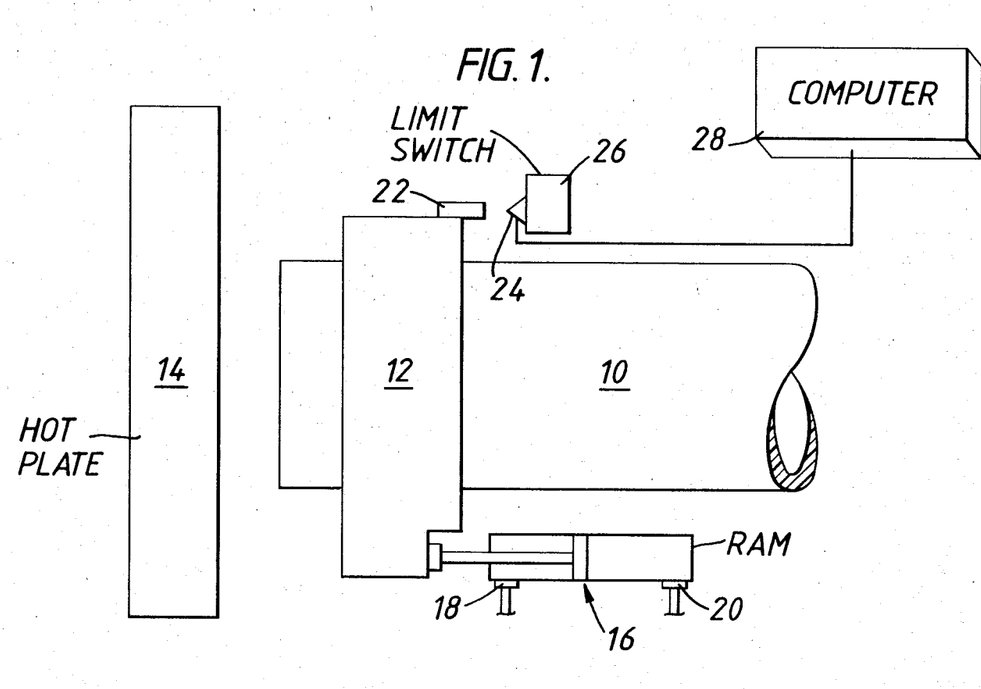
FIG. 1 is a schematic diagram of part of the apparatus.

FIG. 1 shows a natural gas distribution pipe 10 of thermoplastic material held by a clamp 12 which is advanceable towards a heater plate 14 by the pistons of a pair of rams, one of the rams 16 being shown. Each ram 16 is double-acting and has its cylinder connected to another clamp (not shown) holding another pipe (not shown) of thermoplastic material. The clamp 12 is guided for movement towards and away from the other clamp on slide-bars of a guide-frame (not shown) to which that other clamp is secured. The plate 14 is also mounted on the frame and is free to move relatively to the frame as the ends of the two pipes are forced against the opposite faces of the plate.

The piston rods of the rams 16 are connected to the clamp 12 so that the clamp 12 can be retracted away from the other clamp to separate the pipe ends from the plate 14. Each ram cylinder has two supply/exhaust ports 18, 20 connected by respective conduits to a change-over valve described below with reference to FIG. 2.

The clamp 12 carries a cam 22 engageable, when the clamp 12 is fully retracted, with a follower 24 of a limit switch 26 mounted on an end-stop of the frame. The limit switch 26 is connected to a microcomputer 28, which is shown also in FIG. 2.

Figure 2:
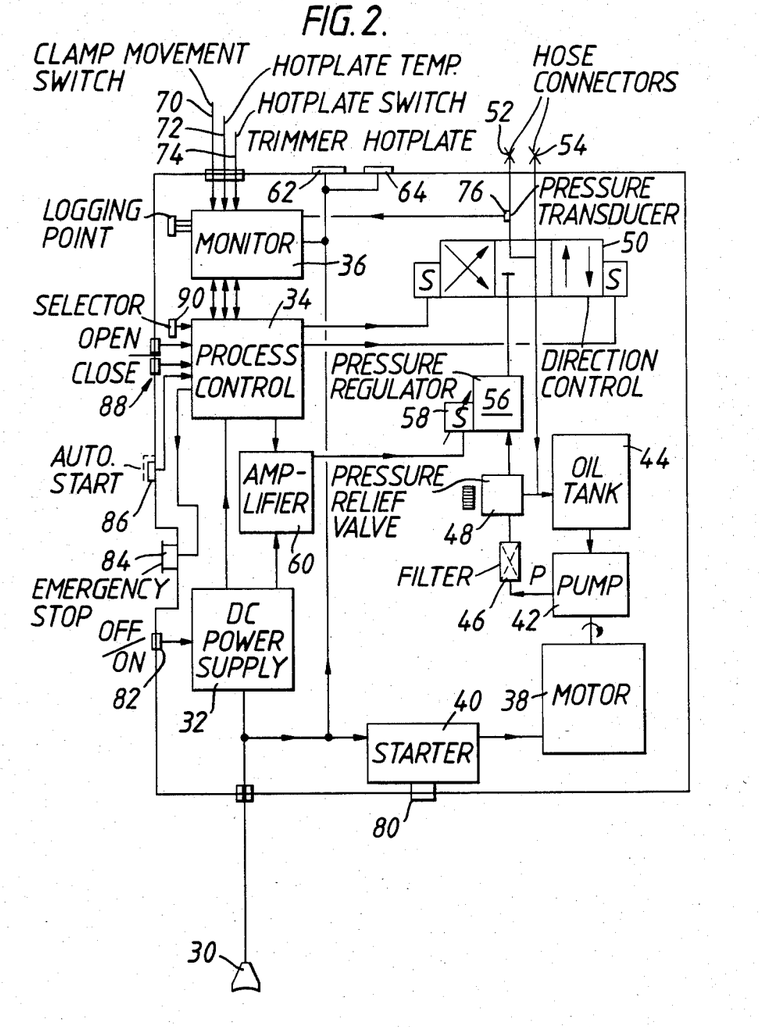
FIG. 2 is a schematic block diagram of a control unit forming part of the apparatus.

FIG. 2 shows the control unit which includes the following main components: a connector 30 connectable to a portable electric generator (not shown) typically supplying 110 volts, 3 kilovolt-amperes; a DC power supply 32; a microcomputer-based control assembly 34, 36; an electric motor 38 with a starter circuit 40; a hydraulic pump 42 driven by the motor 38; a hydraulic fluid tank 44 supplying the pump 42 with associated filter 46 and pressure-relief valve 48; a hydraulic changeover valve 50, which is solenoid-operated, the solenoid currents being supplied from the control assembly 34; connections 52, 54 which are connected to the changeover valve 50 and which are connectable by hydraulic hoses to the ports 18, 20 of the rams 16, as shown in FIG. 1; a hydraulic proportional pressure-reducing valve 56 which is controlled by a solenoid 58 energised by a variable current from an amplifier 60; the output from the valve 56 passes via the changeover valve 50 to one or other of the connections 52, 54; and supply sockets 62, 64 providing 110-volt supplies for driving mechanism (not shown) for trimming the ends of the pipes and for energising the heater plate 14, respectively.

The unit also includes connections at 70, 72, 74 for conductors connected to the limit switch 26, (FIG. 1), a temperature sensor (not shown) on the heater plate 14 and a switch (not shown) controlling energisation of the plate, respectively. Also, a hydraulic pressure transducer 76 is provided in the line between the changeover valve 50 and the connection 52 and the transducer output is fed to the control sub-assembly 36.

The control unit also has a motor start button 80; a power on/off switch 82; an emergency stop button 84; a start button system 86 by which the operating sequence can be started only by deliberate actuation; and buttons 88 by which after the emergency stop button has been operated, the clamps can be advanced or retracted by the rams 16.

The control unit includes a selector switch 90 by which, typically for example, any one of eight data options may be manually selected to cover say four pipe sizes and two pipe materials. For example, the pipe sizes may be inside diameters of 125 millimeters, 180 mm, 180 mm and 250 mm with wall thicknesses of 11 mm; 10 mm; 16 mm; and 15 mm, respectively. The two materials may be for example two different grades of medium density polyethylene. However, the invention is readily applicable to other sizes and materials e.g. to sizes in the range 63 to 125 mm inside diameter and 250 to 500 mm and beyond. The data is stored within the main program in an EPROM in the assembly 33, 36.

The valve 56 is preferably of the type specified as AEDRV/6/100/24 available from the Swiss Wandfluh company. Its solenoid 58 is energised by a square-wave current the mark-space ratio of which is varied by two clock timer circuits in the assembly 34, 36.

Figure 3:
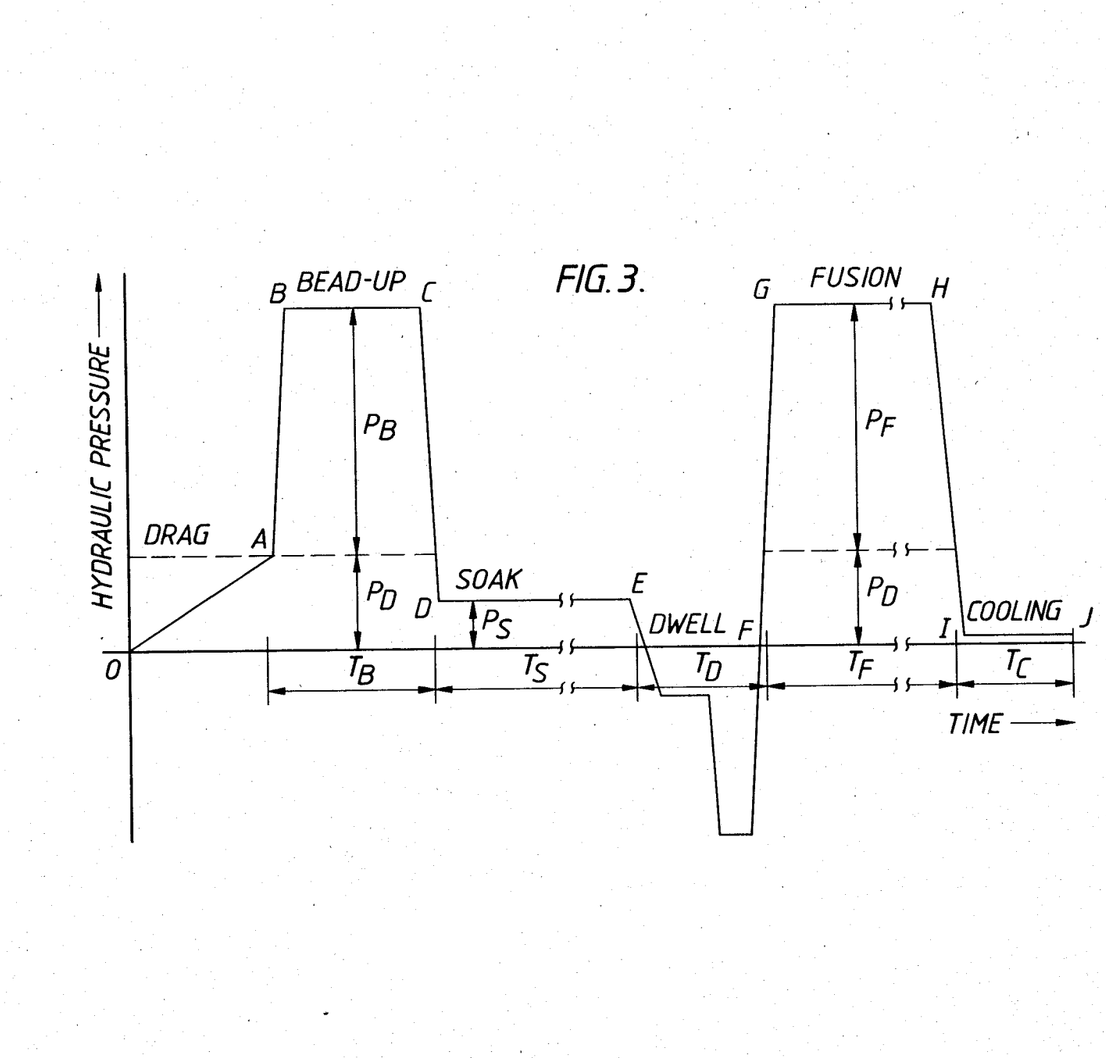
FIG. 3 is a schematic simplified diagram showing changes in hydraulic pressure in the rams shown in FIG. 1 plotted against time during a complete cycle of operation of the apparatus.

FIG. 3 shows a typical complete cycle of hydraulic pressure variation. The pressure variations above the horizontal axis occur while the rams 16 are pressurised in the first sense to force the pipe ends against the plate 14 or against each other. The pressure variations below the horizontal axis occur while the rams 16 are pressurised in a second opposite sense by changeover of the valve 50 to separate the pipe ends.

The various stages of the cycle are as follows: from O to A the pressure of the fluid fed to the rams 16 is increased as explained below until at a drag pressure $P_D$ the force of the rams overcomes the drag resistance of the pipe which is movable towards the other pipe. The movement of the clamp 12 with the pipe is detected by the limit switch 26 which opens as the cam 22 leaves the follower 24.

From A to B the ram pressure is further increased by an amount $P_B$ determined by the data option, the full pressure rise ocurring after the pipe ends have engaged the heater plate 14. From B to C the pressure is held constant for a time $T_B$ as beads are formed at the pipe ends as softened material is extruded radially under the applied pressure. This stage is called "bead-up". From C to D pressure is reduced to a soak pressure $P_S$ but the pipes remain in contact with the plate 14 so that from D to E heat "soaks" into the pipe ends for a soak period $T_S$.

From E to F, after operation of the changeover valve 50, the rams 16 retract to withdraw the pipe ends from the plate 14. During this "dwell" period $T_D$ the plate 14 is withdrawn by mechanism which need not be shown or described here. The movable pipe is pushed back against reverse frictional resistance in this stage. From F to G after operation of the changeover valve 50 the ram pressure is again increased in the sense to advance one pipe into engagement with the other. There is no need for an initial stage of gradual pressure build-up corresponding to the stage O to A shown in FIG. 3. A valve corresponding to the pressure $P_D$ originally required to overcome the drag resistance is stored in the system 34, 36.

The applied pressure is the sum of the pressure $P_D$ and an additional pressure $P_F$ determined by the data option i.e. the fusion pressure. From G to H the pressure is maintained constant for a fusion period $T_F$ to the joint between the pipes. From H to I the pressure is reduced and from I to J the pressure is held at a low value for a cooling period $T_C$ to allow the softened material to re-harden to complete the joint.

Figure 4A:
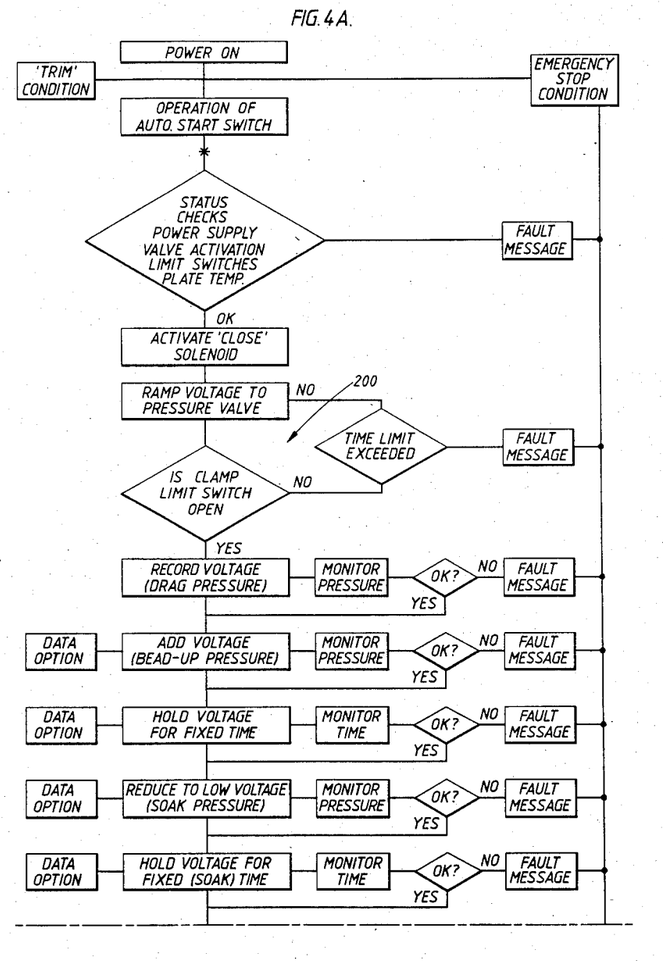
FIGS. 4A, 4B and 4C are a flow chart for the operation of the apparatus.
Figure 4B:
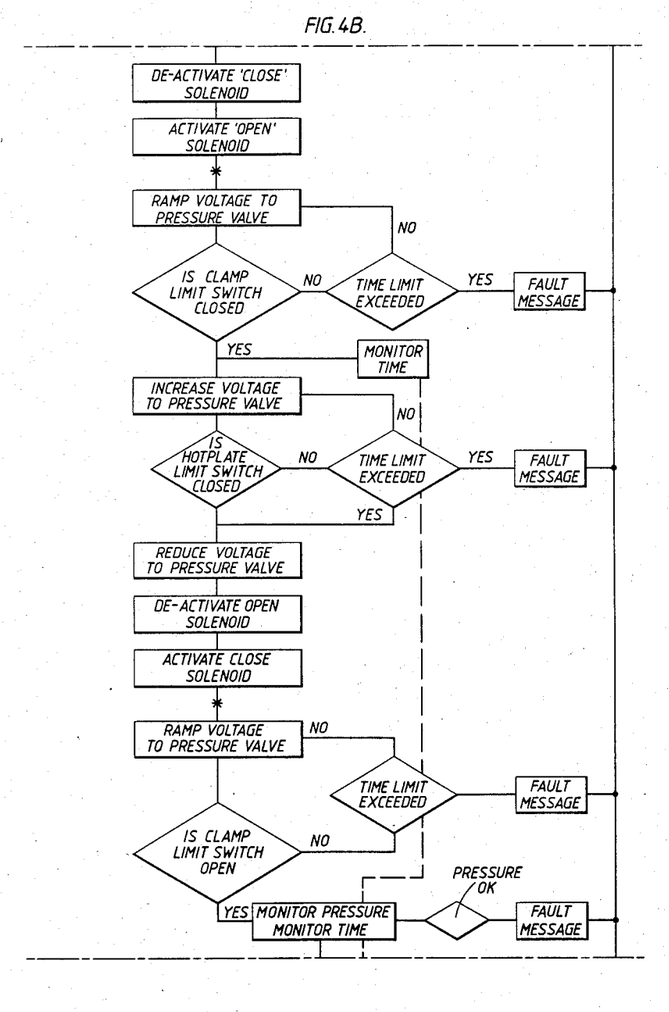
Figure 4C:
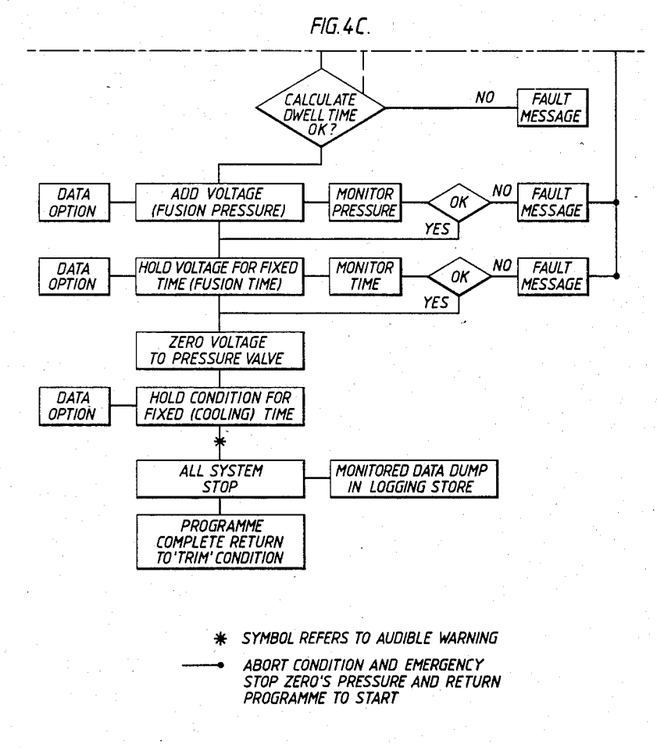

FIG. 4 shows the complete flow chart for the cycle. The stage O to A shown in FIG. 3 is effected by the logic loop 200 in FIG. 4. So long as the limit switch 26 (FIG. 1) remains closed, successive executions of the logic loop cause successive changes in the clock timer circuits determining the mark-space ratio of the square wave current supplied to the solenoid 58 (FIG. 2). The load exerted by the solenoid is thus successively increased so that the pressure determined by the valve 56 is increased by successive steps.

Once the pipe moves and the limit switch opens the program beyond the loop 200 becomes effective. The voltage corresponding to the solenoid current is recorded in digital form, representing drag pressure $P_D$ and in the next step of the programme a voltage determined by the option corresponding to bead pressure $P_B$ is added to the voltage $P_D$ so that the bead-up pressure at B-C in FIG. 3 is applied.

When the fusion stage is reached, the recorded voltage representing $P_D$ is added to the option voltage for the fusion pressure $P_F$ so that the total fusion pressure corresponds to the sum of those voltages. In the flow chart, the steps specified as "monitor pressure" take account of the pressure as monitored by the transducer 76 (FIG. 2). Should the pressure not match predetermined levels at each stage a fault response ensues and the cycle is aborted.

In the flow chart the reference to the "close" solenoid means that solenoid of the changeover valve 50 which sets the valve to the position in which fluid flow to the rams 16 moves the clamp 12 towards the other clamp. The "open" solenoid means the other solenoid of the valve 50. The "pressure valve" is the valve 56.

The parameters $P_D, P_B, P_S, P_F, T_B, T_S, T_D, T_F$ and $T_C$ are all predetermined by the program, including the data options, included in the program used in the assembly 34,36. In addition the hydraulic circuit is designed to produce hydraulic fluid flow rates which ensure on a repeatable basis that sound joints are produced. In particular, at the end of the soak period D-E (FIG. 3) it is important that the rate of fluid flow is such as to separate the pipes from the plate 14 quickly enough to avoid any tendency of the bead to cling to the plate. The flow rates overall ensure that the total cycle time is kept to a minimum.

The automatic programme does not fully control the operation of trimming the pipe ends. The approach and retraction movements of the clamp is controlled manually. However, the trim pressure is automatically controlled by the program.

Figure 5:
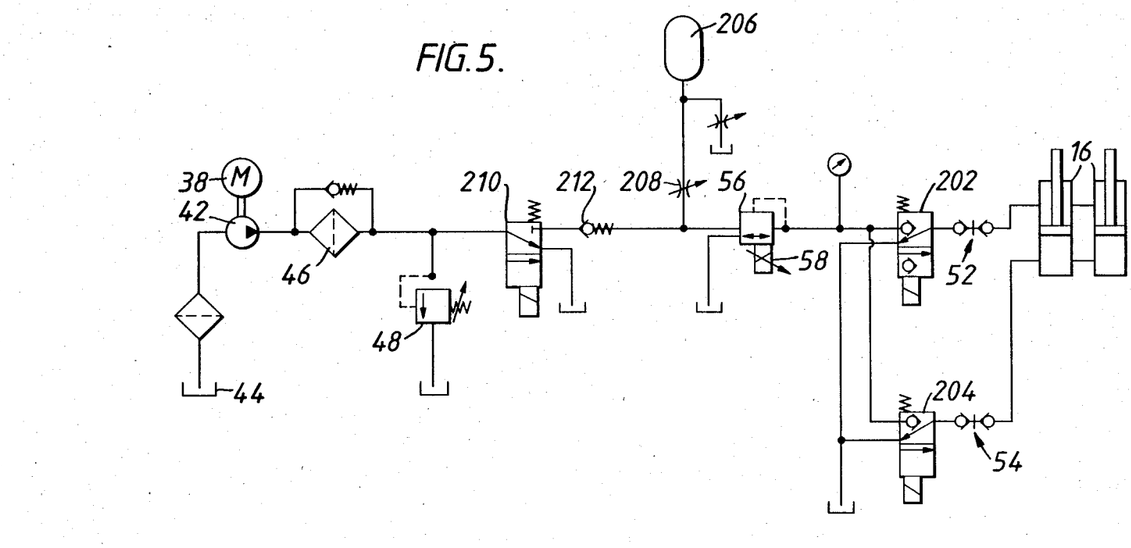
FIG. 5 is a diagram showing a preferred hydraulic circuit for use in the apparatus as an alternative to the circuit shown in FIG. 2.

FIG. 5 shows a preferred form of hydraulic circuit. In that circuit 20 reference numerals corresponds to those used in FIG. 2 as far as possible. Instead of a single valve 50 for changeover use, two separate solenoid-operated valves 202, 204 are used. An accumulator 206 is connected to the pump side of the regulator valve 56 via a flow regulator 208.

A solenoid-operated dump valve 210 is provided. The circuit shown in FIG. 5 has the following advantages:

(i) the hydraulic dump pressure is low so that little heat loss is incurred;
(ii) there is little internal leakage allowing long periods between successive pump operation to load up the accumulator;

(iii) the motor 38 can be switched off during low demand;

(iv) changes in the computer program are needed only to effect variation in the pressure or flow.

Typically, the pump charges the accumulator until a pressure of say 86 bar is detected by a transducer (not shown) in the accumulator line. The microprocessor then de-energises the valve 210 so that the pump flow is dumped to tank at low pressure.

The accumulator charge is held by a check valve 212. During low demand periods only accumulator flow is used. If the accumulator capacity is exceeded, pressure fall causes the pump to re-charge the accumulator. In periods of high flow the microprocessor switches to pump load and combined accumulator and pump flow can be used. The maximum accumulator discharge flow is limited by the pressure-compensated flow regulator 208.

In the stage O-A (FIG. 3) the accumulator is preferably loaded up at the same time as the pressure in the rams 16 is increasing so that the rate of flow into the rams 16 is limited to say 4 liters per minute. In the stage B-C pressurised fluid is dumped when the accumulator pressure reaches 86 bar as detected by the transducer in the accumulator line. In the stage D-E the accumulator is loaded up when the accumulator pressure falls to 63 bar. In the stage E-F a combined flow from the accumulator and the pump of nearly 8 liters/minute is used. In the stage G-H the fluid is dumped when the accumulator pressure reaches 86 bar and in I-J the accumulator is loaded up when its pressure falls to 63 bar.

Figure 6:
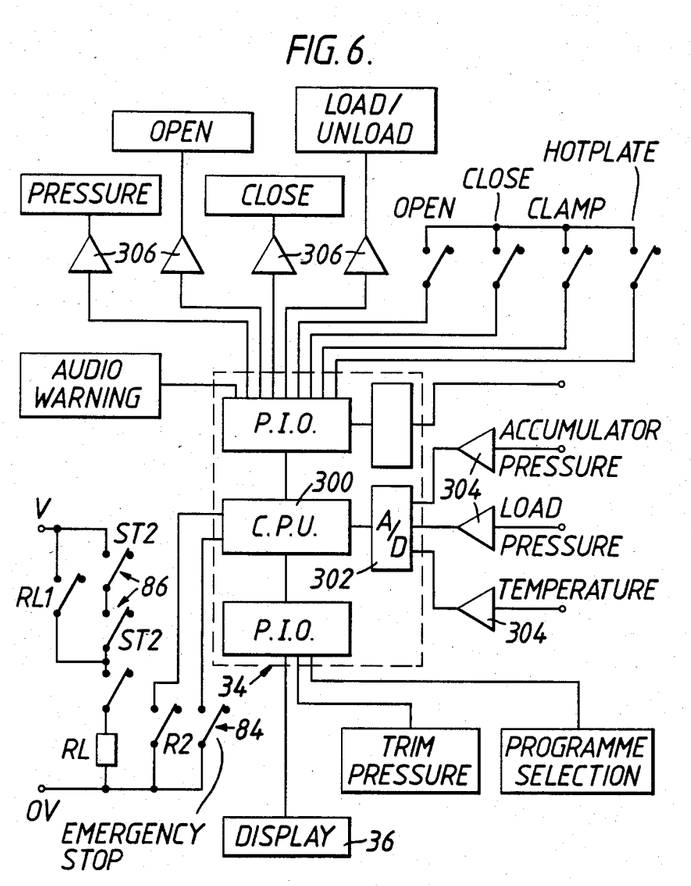
FIG. 6 is a schematic block diagram of the microprocessor shown in FIG. 2.

FIG. 6 shows the assembly 35, 36 in more detail. The central processing unit 300 receives digital inputs representing accumulator pressure, load pressure (i.e. pressure in the rams 16) and plate temperature from analogue-to-digital convertors 302. The convertors receive inputs from amplifiers 304 receiving signals from the corresponding transducers.

Four outputs from the microprocessor are marked "pressure", which is the control current for the solenoid 58; "open" and "close" which are the control currents for the solenoids of the valve 50 (or of the valves 202, 204 in FIG. 5); and "load/unload" which is the signal controlling the running of the motor 38. Those signals are amplified by amplifiers 306.

In a modification (not shown) a displacement transducer is used instead of a limit switch to detect relative movement of the clamps. In another modification (not shown) the program fully controls the trimming of the pipe ends. In yet other modifications (not shown) the pump is driven by an internal combustion engine; or is manually operable but within manual control of the ram pressure.

I claim:

1. Apparatus for joining thermoplastic pipes by fusion comprising two clamps mounted on a guide structure, hydraulic ram means operable to force one clamp towards the other along the guide structure, a device arranged to detect movement of one clamp towards the other clamp, a microprocessor-based control system, a source of pressurised hydraulic fluid including a pump, a hydraulic control valve which has a control solenoid and which is operable in response to control of solenoid current by said system to increase the ram means fluid pressure at a pre-programmed relatively lower first rate until said device detects said movement, whereupon said system changes said solenoid current by a pre-programmed amount so that said pressure is further increased at a relatively higher second rate and the ram means completes its advance to effect bead-up.

2. Apparatus according to claim 1, in which a value corresponding to the fluid pressure causing said movement occurs is stored by said system.

3. Apparatus according to claim 2, in which a pressure is applied during fusion which is the sum of the pressure corresponding to said value and a further pre-programmed pressure.

4. Apparatus according to claim 1, in which said source includes a hydraulic accumulator arranged to receive fluid from the pump and to supply fluid to the ram means.

5. Apparatus according to claim 4, in which a transducer monitors pressure in the accumulator and in which an unload valve dumps pressurised fluid to tank when the monitored accumulator pressure reaches a higher value and the unload valve loads up the accumulator when the monitored accumulator pressure falls to a lower value.

6. Apparatus according to claim 1, in which pressure is increased at said lower first rate by successive pre-programmed increments of pressure each added after control system has executed a control loop in which the condition of said device is monitored.

* * * * *